(12) United States Patent
Masters et al.

(10) Patent No.: US 6,401,646 B1
(45) Date of Patent: Jun. 11, 2002

(54) SNAP-ON ROTATING REDUCTION FAIRING

(75) Inventors: Randy W. Masters; Rodney H. Masters, both of Houston, TX (US); Michael P. Edfeldt, Helena, AL (US)

(73) Assignee: AIMS International, Inc., Houston, TX (US)

( * ) Notice: Subject to any disclaimer, the term of this patent is extended or adjusted under 35 U.S.C. 154(b) by 1 days.

(21) Appl. No.: 09/662,389

(22) Filed: Sep. 14, 2000

(51) Int. Cl.[7] .................................................. F15D 1/10
(52) U.S. Cl. ...................................................... 114/243
(58) Field of Search ........................... 114/264, 243, 114/67 R; 244/3.24, 3.25, 3.26, 119; 405/211

(56) References Cited

U.S. PATENT DOCUMENTS

| | | | |
|---|---|---|---|
| 3,241,513 A | * 3/1966 | Rather et al. | 114/243 |
| 3,454,051 A | * 7/1969 | Goepfert et al. | 114/243 |
| 3,859,949 A | * 1/1975 | Toussaint et al. | 114/243 |
| 4,365,574 A | * 12/1982 | Norminton | 114/243 |
| 4,398,487 A | 8/1983 | Ortloff et al. | 114/243 |
| 4,474,129 A | 10/1984 | Watkins et al. | 114/243 |
| 4,542,708 A | * 9/1985 | Holcombe et al. | 114/243 |
| 4,829,929 A | * 5/1989 | Kerfoot | 114/243 |
| 5,410,979 A | 5/1995 | Allen et al. | 114/243 |
| 5,456,199 A | * 10/1995 | Kernkamp | 114/111 |
| 6,048,136 A | 4/2000 | Denison et al. | 405/211 |
| 6,062,769 A | 5/2000 | Cunningham | 405/195.1 |
| 6,067,922 A | 5/2000 | Denison et al. | 144/243 |
| 6,092,483 A | 7/2000 | Allen et al. | 144/264 |
| 6,223,672 B1 | * 5/2001 | Allen et al. | 114/243 |
| 6,244,204 B1 | * 6/2001 | Weyman | 114/243 |

* cited by examiner

*Primary Examiner*—Michael J. Carone
*Assistant Examiner*—Denise Buckley
(74) *Attorney, Agent, or Firm*—Fulbright & Jaworski LLP

(57) ABSTRACT

The present invention is directed to a fairing system for the reduction of vortex-induced vibration and minimization of drag about a substantially cylindrical element immersed in a fluid medium. The fairing system includes a plurality of cylindrical shells rotatably mounted about a cylindrical element immersed in a fluid medium. Each cylindrical shell has opposing edges defining a longitudinal gap configured to allow the shells to snap around the cylindrical element. The longitudinal gap has a circumference of about 120° relative to the circumference of each shell. Alternatively the longitudinal gap can have a circumference of about 60° relative to the circumference of each shell. The shells also include a fin positioned along the each opposing edge of the longitudinal gap, in which each fin extends outwardly from each shell. The fins are positioned on each shell so as to reduce vortex-induced vibration and minimize drag on the cylindrical element.

20 Claims, 3 Drawing Sheets

SNAP-ON ROTATING REDUCTION FAIRING

FIELD OF THE INVENTION

The present invention relates generally to the reduction of vortex-induced vibration ("VIV") and more particularly to the reduction of VIV on pipes or other structural components immersed in a fluid.

BACKGROUND OF THE INVENTION

Exploration for oil and natural gas reserves led drillers offshore many years ago and as offshore exploration continues, drillers find themselves in deeper and deeper waters. While those waters may bring the reserves they seek, the drillers are also faced with stronger currents threatening the structural integrity of their risers, pipelines, and other elongated components involved in oil and gas production.

Stresses on the pipes or other structural components immersed in fluid, such as a drilling riser, greatly increase as the velocity of the current increases and the stresses are magnified as the depth of the water at the well location increases. When operating drilling rigs in high current areas, the riser is exposed to currents that can cause at least two kinds of stresses. The first is caused by vibration resulting from vortices shed off a component when fluid flows by it. That vibration, occurring perpendicular to the current, is referred to as "vortex-induced vibration," or "VIV." When water flows past the riser, vortices are alternatively shed from each side of the riser. This produces a fluctuating force that the riser transfers to the current. If the frequency of this harmonic load is near the resonant frequency of the riser, large vibrations transverse to the current can occur. The second type of stress is caused by the drag forces that push the riser in the direction of the current due to the riser's resistance to fluid flow. The drag forces are amplified by the vortex-induced vibrations of the riser. A riser pipe that is vibrating due to vortex shedding will disrupt the flow of water around it more than a stationary riser. This results in more energy transfer from the current to the riser, and hence more drag.

Shrouds, strakes and fairings have traditionally been added to drilling risers and other submerged pipes in order to minimize the current-induced stresses on these pipes. Strakes and shrouds can be effective regardless of the current orientation, but they tend to increase the drag acting on the riser. By contrast, fairings are generally more effective in reducing drag and VIV. Fairings generally comprise streamlined shaped bodies that weathervane or rotate about the riser maintaining positions substantially aligned with the water current. Fairings generally reduce vortex-induced forces and minimize drag on the riser by reducing or breaking up the low pressure areas that exist down-current of the riser.

One example of a fairing is found in U.S. Pat. No. 4,474,129 that discloses a fairing removably mountable on risers equipped with buoyancy modules that has a tail tapering aft and a fin positioned after the tail. This fairing completely surrounds the riser and is fastened together at the back portion of the fairing. Another example of a fairing is found in U.S. Pat. No. 4,398,487 which describes a streamlined symmetrical structure having a nose portion, a tail portion and two opposed side portions. This fairing is formed as two shell halves that completely surround the riser and are connected at the front end of the nose by quick release fasteners and the end of the tail portion by hinges. U.S. Pat. No. 5,410,979 describes a small fixed teardrop-shaped fairing that surrounds a riser and is fixed to the riser so as to not rotate. U.S. Pat. No. 6,048,136 describes a fairing that is installed on a drilling riser in combination with a synthetic foam buoyancy module. This fairing is formed as two shell halves that surround the riser and attach at the front and back portions of the fairing. A rotating fairing is described in U.S. Pat. No. 6,067,922 as including a copper element mounted in the annular region of the fairing to discourage marine growth. This fairing is formed as a single piece that completely surrounds the riser and is attached at the tail or flange portion with bolts. Another known fairing or strake 2, shown in FIG. 2, is constructed of fiberglass or polyurethane in two molded halves 4A and 4B that are strapped around the circumference of the riser. Asymmetrical fins 6 are molded along the sides of this strake. It should be noted that all of the above described fairings are constructed in predetermined lengths and a plurality of fairings are positioned along the length of any particular riser.

While fairings can be effective for reducing VIV, a number of problems still exist with the prior art fairings. As illustrated in the prior art, fairings have become more and more complex in design, they often require a large number of parts, and as such, they have become more costly to produce and maintain. Generally, fairings must be secured to the elongated component by bands, bolts or other fasteners that may fail. Further, the use of such fasteners adds to the cost and labor associated with the fairing's use. Additionally, corrosion and marine growth frequently causes the rotational elements of a fairing to seize up so that it can no longer properly align with the current. Such a concern has often resulted in fairings being used only on risers or other components that remain on the risers only a short period of time, leaving those in the industry to rely upon less effective VIV reduction means for more permanently fixed components.

Fairings are typically applied to drilling risers in one of two ways. In one manner of installation, fairings are placed on the drilling riser after it is in place, suspended between the platform and the ocean floor, in which divers or submersible vehicles are used to fasten the multiple fairings around the drilling riser. A second method of installation is carried out as the riser is being assembled on a vessel. In this method the fairings are fastened to the pipe as lengths of pipes are fitted together to form the riser. This method of installation is performed on a specially designed vessel, called an S-Lay or J-Lay barge, that has a declining ramp, positioned along a side of the vessel and descending below the ocean's surface, that is equipped with rollers. As the lengths of pipe are fitted together, fairings are attached to the connected pipe sections before the pipe is rolled down the ramp and into the ocean. One of the problems of installing fairings in this manner is that when the fins of the fairing rotate over the rollers on the ramp, the fins frequently become damaged by the rollers. In this method of installation, the completed drilling riser is pulled up to a vertical position when it reaches the appropriate length and is attached to the surface platform and the well head on the ocean floor.

It would be advantageous to provide a relatively lightweight, resilient fairing that can be easily snaked in place on a riser rather than having to be fastened around the entire circumference of a riser.

It would also be advantageous to have a fairing that rotates around the riser and takes advantage of natural boundary layer formation in the reduction of VIV on risers.

It would further be advantageous to provide a fairing that allows for pressure equalization and a reduction of marine growth.

SUMMARY OF THE INVENTION

The present invention is directed to a fairing system for the reduction of vortex-induced vibration and minimization of drag about a substantially cylindrical element immersed in a fluid medium. The fairing system includes a plurality of cylindrical shells rotatably mounted about a cylindrical element immersed in a fluid medium. Each cylindrical shell has opposing edges defining a longitudinal gap configured to allow the shells to snap around the cylindrical element. The longitudinal gap has a circumference of about 120° relative to the circumference of each shell. Alternatively the longitudinal gap can have a circumference of about 60° relative to the circumference of each shell. The shells also include a fin positioned along the each opposing edge of the longitudinal gap, in which each fin extends outwardly from each shell. The fins are positioned on each shell so as to reduce vortex-induced vibration and minimize drag on the cylindrical element.

The inventive fairing can be constructed from a non-metallic, low corrosive material such as fiberglass, polyurethane, vinyl ester resin, PVC or other materials having substantially similar flexibility and durability properties.

BRIEF DESCRIPTION OF THE DRAWINGS

The invention will become more apparent when the detailed description of exemplary embodiments is considered in conjunction with the appended drawings, in which.

DETAILED DESCRIPTION OF THE INVENTION

The present invention is directed to rotating fairings that include specifically placed fins for the reduction of vortex-induced vibration ("VIV") on pipes or other structural components immersed in fluid. As discussed above, when a solid object is exposed to fluid flows vibration results from vortices shed off the object when the fluid flows by it. It has been shown in the literature that in laminar flow over boundary surfaces, energy losses will subsequently be shown, theoretically and experimentally, to be directly proportional to velocities. Thus, when fluid flow takes place in close proximity to a boundary surface the flow, although turbulent, possesses the velocity and pressure characteristics of an ideal fluid flow. As real fluid flows in turbulent conditions over the surface of a solid object placed in the flow, the effects of velocity will create velocity conditions at the surface of the object similar to those described above.

However, a laminar film forms over the surface of the object that is not of a constant thickness. This is so because the laminar film forms no thickness at the front of the object where the fluid first contacts the object, however, the film thickness increases along the surface of the object in the direction of motion; this type of laminar film is termed a "laminar boundary layer." Under certain conditions, this layer may change into a "turbulent boundary layer" which possesses a thin laminar film beneath it and adjacent to the object. The boundary layer, in adhering to or separating from the object on which it forms, brings about different flow phenomenon and different effects upon the drag force. On a streamlined object, the boundary layer will adhere to the surface of the object and the flow picture appears to be identical to that of an ideal fluid flow. On a blunt object, however, the boundary layer will cause the flow to separate from the object, resulting in a flow picture very different from that of ideal fluid, e.g. eddies are created. *Elementary Fluid Mechanics* by John K. Vennard, 2d Ed.; John Wiley & Sons, Inc., New York, pp 132–137.

It has surprisingly been discovered that if a fairing has a pair of fins positioned at an angle of about 120°, relative to the circumference of the cylindrical fairing, it takes advantage of the natural boundary layer formation as discussed above, so as to proximate real fluid flow which results in a substantial reduction of VIV on pipes or other structural components immersed in fluid.

Figure 1:
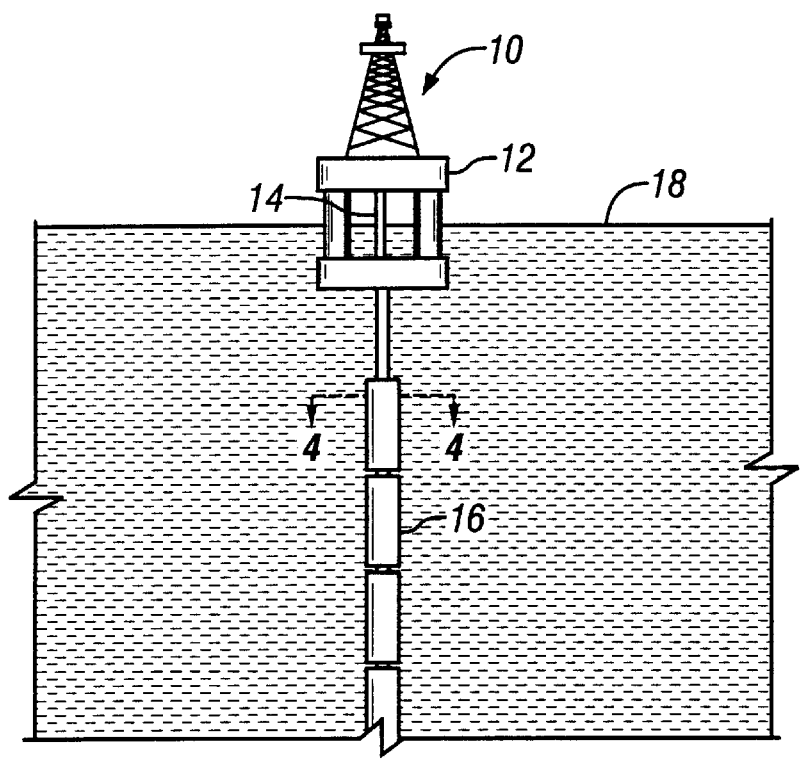
FIG. 1 is a side elevational view of a drilling vessel illustrating the use of the inventive fairings in the environment in which the invention is used.

The present invention is directed to a snap-on rotatable fairing system having generally a 120° fin angle for the reduction of VIV on pipes or other structural components immersed in fluid. Preferably, the inventive fairing is installed on drilling risers used in offshore oil and natural gas exploration. FIG. 1 illustrates a preferred environment in which the inventive fairing is used. A drilling vessel or platform 10 provides surface facilities 12. Drilling riser 14 descends from beneath the deck of the surface facilities 12 and is fitted with rotatable fairings 16 below the ocean surface 18. A plurality of fairing 16 are installed along the drilling riser 14 to reduce VIV and minimize drag on the long unsupported drilling riser 14. This illustrative embodiment shows the fairing system installed on a drilling riser. However, cylindrical pipes are employed in a variety of other applications such as subsea pipelines; drilling, import and export risers; tendons for tension leg platforms; legs for traditional fixed and for compliant platforms; other mooring elements for deep water platforms; and so forth. Those having ordinary skill in the art can readily apply these teachings to such other applications.

Figure 3:
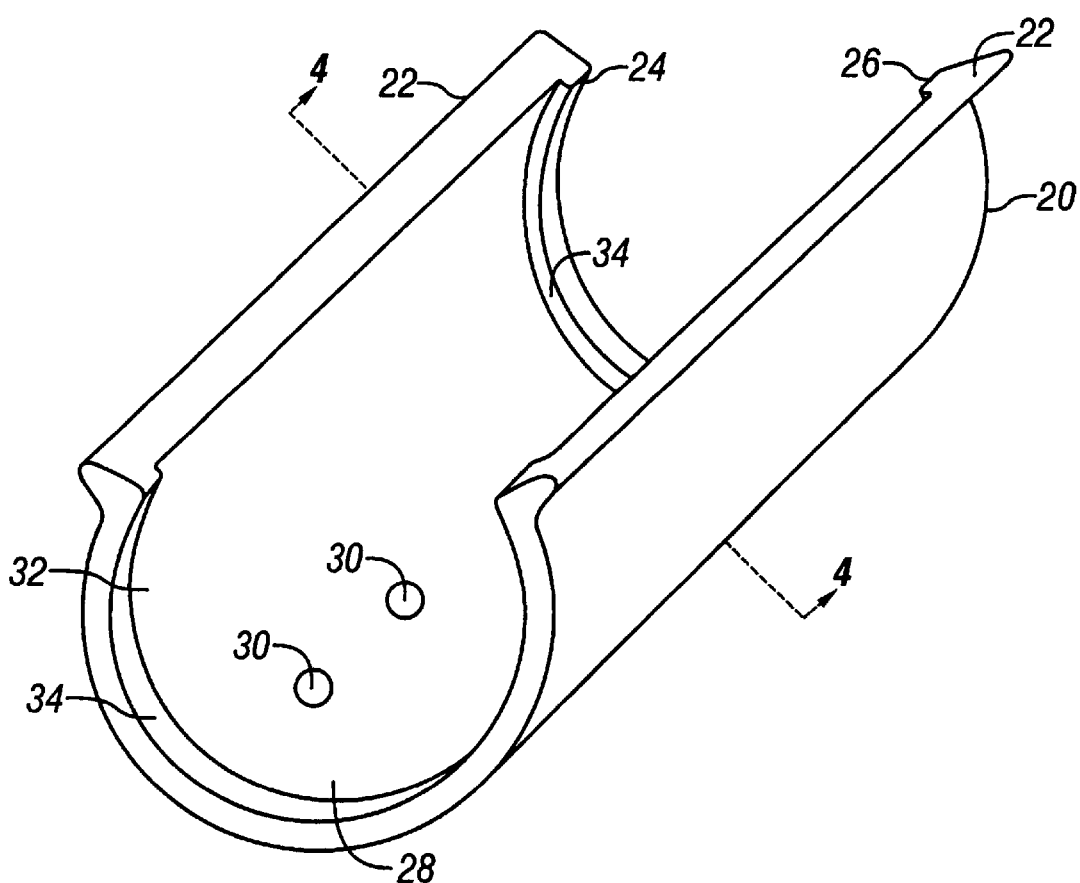
FIG. 3 is a perspective view of one embodiment of the fairing of the present invention.
Figure 4:
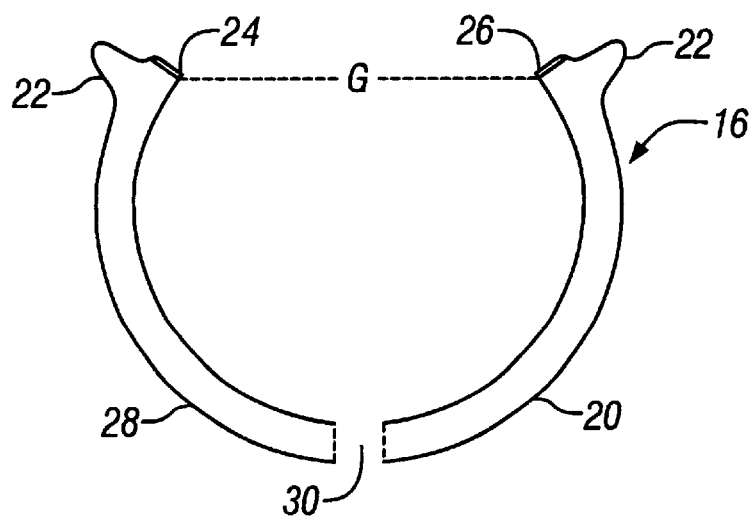
FIG. 4 is a cross-sectional view of the inventive fairing taken along lines 4—4 of FIGS. 1 and 3.

Fairing 16 is formed from a cylindrical shell 20 having opposing edges 24,26 that define a gap G and a pair of corresponding fins 22 extending outwardly in a vertical direction (FIGS. 3 and 4). The spaced apart fins 22 are positioned along opposing edges 24, 26 of the shell and are placed generally at a 120° angle relative to the circumference of a complete circle and hence the circumference of the shell 20 (FIG. 4). Preferably, fins 22 do not extend beyond the nominal outer diameter of the shell 20 so as to minimize drag. Because of the fin angles, vortex eddies are formed more distant from the surface of the riser 14, thus reducing vortex-induced vibration 20 of the riser. The shell's circumference comprises only about 240° of the circumference of a complete circle. The approximate 120° gap G in the shell 20 provides for the "snap-on" feature of shell 20 (FIG. 4).

Figure 5:
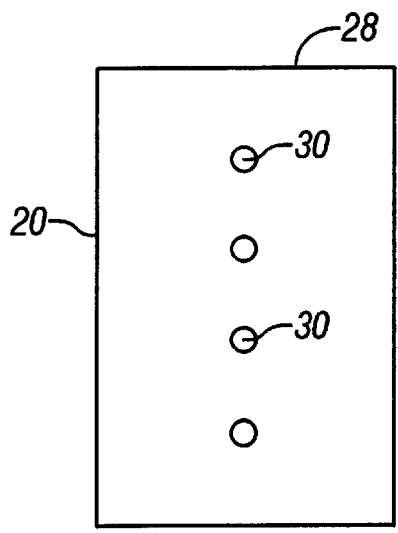
FIG. 5 is a back plan view of the fairing of FIG. 3 illustrating fluid flow openings.

A back portion 28 of shell 20 includes at least two and preferably up to four, circular openings 30 spaced vertically down the face of the shell 20 (FIGS. 3 and 5). The number of preferred circular openings 30 depends upon the length of the fairing. In a 24 inch long fairing, four openings 30 would be preferred, however, in a longer fairing more openings 30 would be required. These fluid flow openings 30 facilitate fluid flow to the inside annular space between the shell 20 and the outside surface of the riser 14. Openings 30 provide for pressure equalization; allow for fluid to reach the bearing face of the shell 20 for lubricating the bearing face with fluid; allow for the flow of fluid to retard marine growth; and to assist in the directional rotation of the shell 20 around the riser 14 in order to align the fairing 16 with the current. In a preferred embodiment, the inside surface 32 of the shell 20 includes a bearing face 34 formed from a thickened portion of the shell material (FIG. 3). The bearing face 34 extends the circumference of the shell 20 and tapers from a thick portion along the back portion 28 of the shell 20 to thinner portions along the open edges 24, 26 of the shell 20 (FIG. 3). The bearing face 34 prevents the thinning of the back portion 28 of the shell 20 as it rotates around the riser 14.

Figure 6:
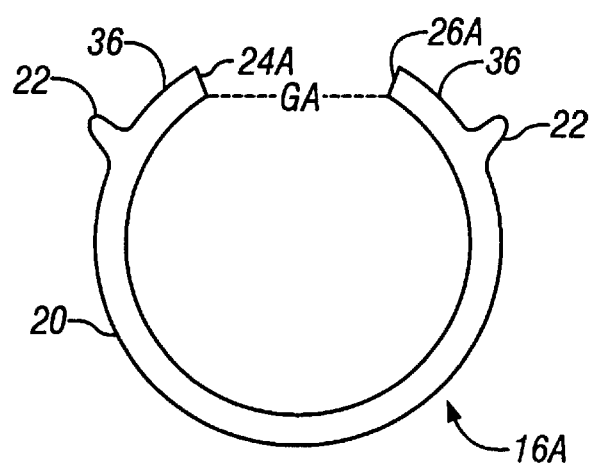
FIG. 6 is a cross sectional view of an alternate embodiment of the inventive fairing.

In an alternate embodiment 16A, snap extensions 36 can extend about 30° beyond the edges 24, 26 in order to allow for a more secure grip on the riser 14 (FIG. 6). Snap extensions 36 provide for an approximate gap GA of 60° between the ends 24A, 26A of the snap extensions 36. The flexibility of the material forming fairing 16A allows it to also be capable of the "snap-on" feature of the inventive fairing.

Figure 7:
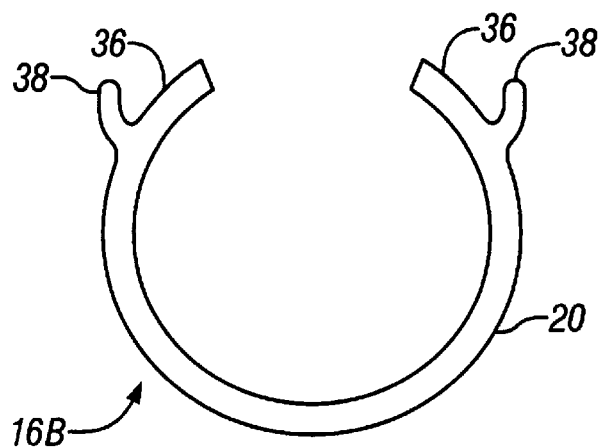
FIG. 7 is a cross sectional view of another alternate embodiment of the inventive fairing.

In yet another alternative embodiment, fairing 16B, trailing fins 38 extend outwardly in a direction parallel with the fluid current in order to move the boundary layer vortex eddies further away from the riser 14 without adding significant drag (FIG. 7). Trailing fins 28 can be any length, however, regardless of the length, the trailing fins 38 do not extend beyond the nominal outer diameter of the shell 20. Any combination of fins 22, snap extensions 36 and trailing fins 38 can be used on the shell 20.

As illustrated in FIG. 1, a number of such fairing 16 segments can be installed on the riser to rotate independently along a longer elongated element. The cylindrical shell 20 is rotatably mounted about a substantially cylindrical element, such as the riser 14, and rotates around the riser 14 to match the fins 22, 38 with the direction of the current.

Fairing 16 can be constructed from any non-metallic, low corrosive material such as a multi-layer fiberglass mat, polyurethane, vinyl ester resin, high or low density polyurethane, PVC or other materials with substantially similar flexibility and durability properties. These materials provide fairing 16 with the strength to stay on the riser 14, but enough flex to allow it to be snapped in place during installation. In a preferred embodiment, the fiberglass can be 20–30,000 psi tinsel strength that is formed as a bi-directional mat or the fairing can be formed of vinyl ester resin with 7–10% elongation or polyurethane. The use of such materials eliminates the possibility of corrosion, which can cause the fairing shell to seize up around the elongated element it surrounds.

In an illustrative example of the inventive fairing 16 formed from a 12.75 inch OD pipe, the following dimensions could be used. Fairing 16 could have a length of 24 inches, an outside diameter of 13 ⅞ inches, a bearing face diameter of 13 inches, and inside diameter of 13 ⅜ inches, a fin height of approximately 1 ½ inches, a fin thickness of ¼ inch and a fin length of 24 inches.

Figure 2:
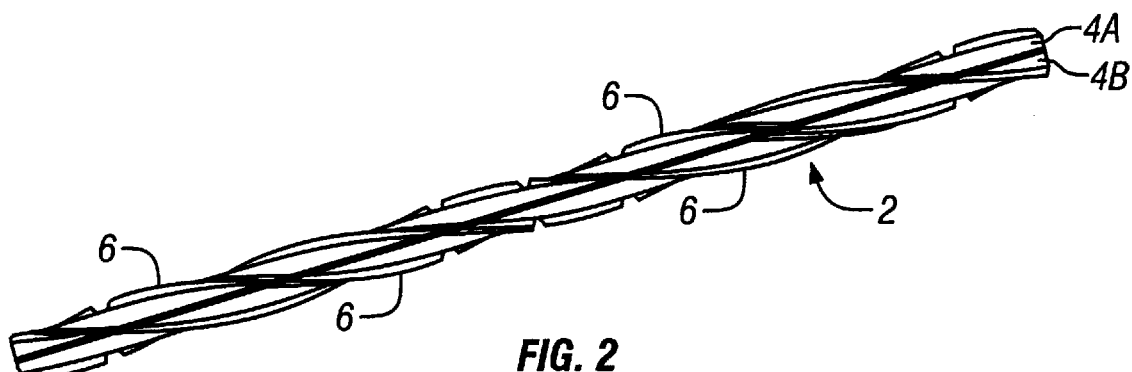
FIG. 2 is a perspective view of a prior art fairing.

The snap-on installation provided by the inventive fairing 16, 16A, 16B requires no straps, bands, bolts or other such fasteners that may fail or increase the cost, labor, and time associated with installation. Further, a snap-on installation can easily be implemented on an S-Lay or J-Lay barge, by a diver, or with a pusher-tool attached to a submersible remotely operated vehicle. As can be appreciated by comparing the prior art fairing of FIG. 2, with the inventive fairing, installation of the shorter, snap-on inventive fairing would be substantially faster, less costly and less time consuming.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the invention. The embodiments described herein are further intended to explain the best modes known for practicing the invention and to enable others skilled in the art to utilize the invention in such, or other, embodiments and with various modifications required by the particular applications or uses of the present invention. It is intended that the appended claims be construed to include alternative embodiments to the extent that is permitted by the prior art.

What is claimed is:

1. A fairing system for the reduction of vortex-induced vibration and the minimization of drag about a substantially cylindrical element immersed in a fluid medium, the fairing system comprising:
   a cylindrical shell rotatably mounted about a cylindrical element immersed in a fluid medium, the shell having opposing edges defining a longitudinal gap configured to allow the shell to snap around the cylindrical element; and
   a fin positioned along each opposing edge of the longitudinal gap, each fin extending outwardly from the shell, the fins being positioned on the shell so as to reduce vortex-induced vibration and minimize drag on the cylindrical element.

2. The fairing system of claim 1, wherein the fairing system includes a plurality of fairings placed adjacent to each other along a longitudinal axis of the cylindrical element.

3. The fairing system of claim 1, wherein the longitudinal gap has a circumference of about 120° relative to the circumference of the shell.

4. The fairing system of claim 1, wherein the longitudinal gap has a circumference of about 60° relative to the circumference of the shell.

5. The fairing system of claim 1, wherein each fin does not extend beyond an outer diameter of the shell.

6. The fairing system of claim 1, wherein each fin extends outwardly from the shell in a direction parallel with a fluid current.

7. The fairing system of claim 1, wherein the shell further includes at least one opening for the flow of fluid, the opening being positioned in the shell opposite the longitudinal gap.

8. The fairing system of claim 7, wherein the shell includes four openings spaced along a 24 inch length.

9. The fairing system of claim 1, wherein the shell includes a bearing face extending between the opposing edges of the shell, the bearing face having a thicker portion along a back portion of the shell and a thinner portion near the opposing edges.

10. The fairing system of claim 1, wherein the shell is constructed from a non-metallic, low corrosive material selected from the group consisting of fiberglass, high or low density polyurethane, vinyl ester resin and PVC.

11. A fairing system for the reduction of vortex-induced vibration and the minimization of drag about a substantially cylindrical element immersed in a fluid medium, the fairing system comprising:

a plurality of cylindrical shells rotatably mounted about a cylindrical element immersed in a fluid medium, each shell having opposing edges defining a longitudinal gap configured to allow the shells to snap around the cylindrical element; and a fin positioned along each opposing edge of the longitudinal gap, each fin extending outwardly from each shell, the fins being positioned on each shell so as to reduce vortex-induced vibration and minimize drag on the cylindrical element.

12. The fairing system of claim 11, wherein the longitudinal gap has a circumference of about 120° relative to the circumference of each shell.

13. The fairing system of claim 11, wherein the longitudinal gap has a circumference of about 60° relative to the circumference of each shell.

14. The fairing system of claim 11, wherein each fin does not extend beyond an outer diameter of each shell.

15. The fairing system of claim 11, wherein each fin extends outwardly from each shell in a direction parallel with a fluid current.

16. The fairing system of claim 11, wherein each shell further includes at least one opening for the flow of fluid, the opening being positioned in each shell opposite the longitudinal gap.

17. The fairing system of claim 16, wherein each shell includes four openings spaced along a 24 inch length.

18. The fairing system of claim 11, wherein each shell includes a bearing face extending between the opposing edges of each shell, the bearing face having a thicker portion along a back portion of each shell and a thinner portion near the opposing edges.

19. The fairing system of claim 11, wherein the shell is constructed from a non-metallic, low corrosive material selected from the group consisting of fiberglass, high or low density polyurethane, vinyl ester resin and PVC.

20. A method for reducing vortex-induced vibration and minimizing drag about a substantially cylindrical element immersed in a fluid medium, comprising the step of:

installing a rotatable fairing about a substantially cylindrical element, the fairing comprising a cylindrical shell having opposing edges defining a longitudinal gap configured to allow the shell to snap around the cylindrical element, the shell further including a fin positioned along each opposing edge of the longitudinal gap, each fin extending outwardly from the shell, the fins being positioned on the shell so as to reduce vortex-induced vibration and minimize drag on the cylindrical element.

* * * * *